July 1, 1930.  W. G. HOLMES  1,769,836
WATER FEED CONTROL
Filed May 1, 1929
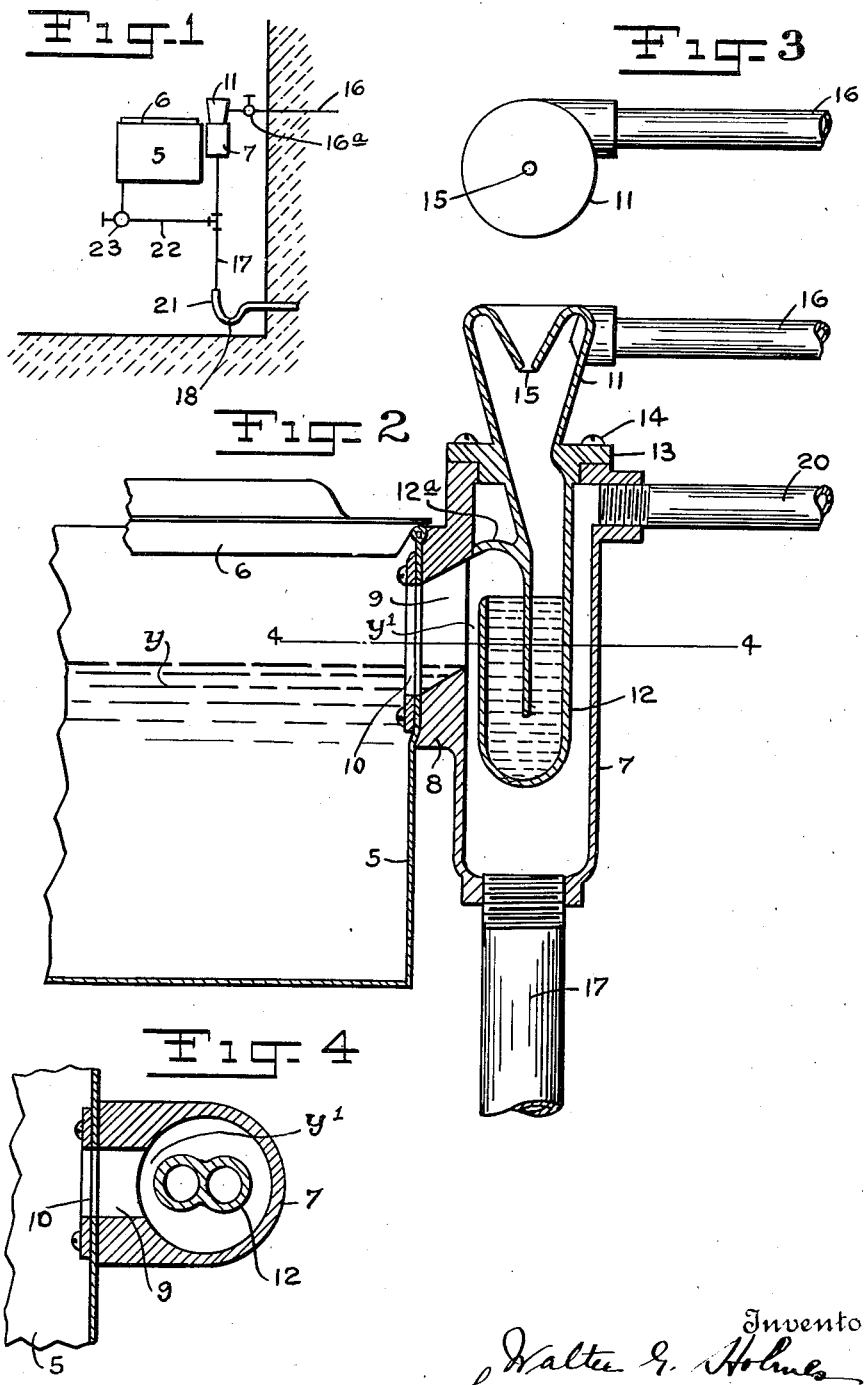
Inventor
Walter G. Holmes
By his Attorney
Clarence G. Campbell Patented July 1, 1930

1,769,836

UNITED STATES PATENT OFFICE

WALTER G. HOLMES, OF MINNEAPOLIS, MINNESOTA, ASSIGNOR TO KNY-SCHEERER CORPORATION, OF NEW YORK, N. Y., A CORPORATION OF NEW YORK

WATER-FEED CONTROL

Application filed May 1, 1929. Serial No. 359,449.

My invention relates to an improvement in a water feed control and its novelty consists in the adaptation and arrangement of parts as will be more fully hereinafter pointed out.

In the following description and in the claims, the term "tank" is herein used in a broad sense to include a receptacle for receiving water from a source of supply such as a city water main.

In the present state of this art, it is the usual practice to fill such tanks by supply connections arranged to deliver into the tank below the high or normally maintained water level in the tank. In such arrangements, should the house supply be shut off and drained or if, for any reason, partial vacuum should be produced in the supply pipe, there will be produced a back-flow of water from the tank into the house supply pipes. If the water in the tank is chemically treated or if polluted in any way so that it is not a good drinking water, the back-flow into the tank and into the house pipes becomes a very serious matter. In fact, serious results have followed from back-flow such as just indicated.

Also, if the valve in the supply pipe should leak, there would be a slow flow of water from the supply, assumed to be the city water supply, into the tank and if the water in the tank should be sterilized water such as used in sterilizers, such leakage would, as is obvious, be a serious matter. In the above indicated hitherto used arrangements for supplying water from a source such as city water to a tank such as a sterilizer, for example, other undesirable actions have also been present, all of which, as well as those noted, are overcome or eliminated in my improved water feed control.

Among the improved actions obtained in my water feed control herein disclosed and claimed the following four may be mentioned.

Under normal flow of water from the supply pipe to the tank, such as produced when the valve in the supply pipe is purposely opened, the water will be delivered from the supply pipe to the tank through a primary water-sealing trap and across an air gap, the water level in the tank will be maintained at a predetermined level, and overflow from the tank will run to the drain pipe through the air gap.

Under a very slow flow of water from the supply pipe such as produced by a leaking valve or a valve not tightly closed, the water will flow not into the tank but to the waste pipe through the air gap and preferably also through a secondary water-sealing trap.

If, for any reason, there should be a partial vacuum produced in the water supply pipe, such as would tend to produce a backflow of water from the tank to the supply pipe, such back-flow will be prevented by an inflow of air through a vacuum-breaking air inlet provided in the delivery device and above the water level in the water-sealing traps.

When a connection is made to a vacuumcreating device or to the atmosphere for the discharge of steam or vapor generated in the tank, such connection is made to the tank through the delivery device on a path that leads between the two traps so that the steam or vapor will not be delivered into the room.

A commercial form of the device is illustrated in the accompanying drawings, wherein like characters indicate like parts throughout the several views.

Referring to the drawings:

Figure 1 is a diagrammatic view in elevation illustrating the manner in which the device is adapted to be connected between a water supply pipe and a tank such as a sterilizing tank;

Figure 2 is a view chiefly in vertical section, but with some parts broken away, particularly showing the construction of my improved water feed control and illustrating the manner of its connection to the tank such as indicated;

Figure 3 is a plan view showing the top portion of my water feed control device; and Figure 4 is a detail in horizontal section taken on the line 4—4 of Figure 2.

The water-receiving tank 5 is shown as provided with a cover 6 between which and the rim of the tank there may be assumed to be a slight leakage of air under very low or partial vacuum produced in the tank. The numeral 7 indicates an upright tubular shell or casing provided with an embossed side 8 which, by screws or otherwise, is rigidly secured with a water-tight joint to one side of the upper portion of the tank 5. At its intermediate portion, the embossed side 8 of the casing 7 is formed with an outlet port 9 that registers with a port 10 in the side of the tank 5 and combines with said port 10 to afford a water inlet passage to the tank. Preferably, the bottom of the port 9 is inclined toward the tank so that it has a relatively sharp crown that determines the maximum water level to be maintained in the tank 5.

Applied on the top of and extending into the casing 7 is a water injector of novel construction and which includes a receiving head 11 and the primary or main water-sealing trap 12, the said parts 11 and 12 being preferably cast integral. At its base, the head 11, as shown, is provided with an outstanding flange 13, which by screws 14, is tightly clamped to the head of the shell 7. This head 11 is formed with a small air inlet 15 that performs a highly important function above briefly noted. As an additionally novel feature, the head 11 is formed with a centrally depressed conical top in the inverted apex of which the air inlet 15 is located; and the water supply pipe 16 is tangentially connected to the upper portion of said head so that water delivered into the head will be caused to take up whirling motion or otherwise stated, to form a vortex around the axis of the head and of the vacuum-breaking inlet 15. In diagram view, Figure 1, water supply pipe 16, is shown as provided with a valve $16^a$. The head 11 delivers directly into the one leg of the trap 12 and the other leg of said trap is located above the water level $y$ in the tank and the overflow edge of the port 9.

Here it is also highly important to note that the discharge leg of the trap 12 while spaced from the wall in which the port 9 is formed so as to form a narrow air gap $y^1$, nevertheless, extends so close thereto that water delivered from the trap under normal flow pressure will be spouted or delivered across said air gap and into and through the ports 9—10 and hence into the tank, while slow leakage from the discharge leg of said trap can only run down the wall thereof or through the said air gap to the bottom of the casing 7.

Here it is highly important to note that the trap 12, immediately above its delivery leg, is provided with a curved flange $12^a$ that joins the top of the port 9, thereby giving and providing said trap with a sort of delivery spout for directing the full flow of water into the receiving port of the tank. A waste pipe 17 is threaded to and extended downward from the bottom of the shell 7.

A vapor draw-off pipe 20 is threadedly connected through the upper portion of one wall of the casing 7. This pipe 20 will usually be connected to a vacuum-creating device such as a fan or blower, (not shown) but will sometimes simply be connected to the outside atmosphere for discharge of vapor from the room in which the apparatus or device is installed. In Figure 1, waste pipe 17, as shown, is arranged to deliver through a water trap 18 to a back-vented sewer pipe connection 21 and the tank 5, as shown, is provided with a drain pipe 22 that is connected to the waste pipe 17 and is provided with a normally closed valve 23. These elements 21, 22 and 23, however, are not features of the present invention.

Operation

The operation of my device above described is as follows: Water delivered into the head 11 from supply pipe 16 will be caused to whirl or form a downwardly moving vortex into the trap 12 and will be forced through the trap 12 and under normal flow produced by an intentional opening of the valve $16^a$ in supply pipe 16 will be discharged from the delivery leg of said siphon under such velocity that it will bridge the air gap between the siphon and port 9 and will flow through ports 9—10 into tank 5, thereby filling said tank to its maximum level $y$.

Normally, of course, the trap 12 will remain filled with water up to the top of its discharge leg, thereby forming an efficient seal between the tank at the one side and the supply pipe 16 and air inlet 15 on the other side.

If for any of the reasons noted or for any other reason, there should be a tendency of back-flow of water or partial vacuum produced in the supply pipe 16, air will be drawn into the head 11 through port 15 and thus break the partial vacuum in said head so that the partial vacuum or suction would not draw the seal-forming water out of the trap 12 and hence it is obvious under no condition or circumstance can a back-flow in the water supply pipe draw either water or vapors from the supply tank back to the supply pipe or to any other portion of the water supply system or the house or building in which the apparatus is installed. This feature is of the utmost importance for in sterilizing, plating tanks and the like, deadly poisons are sometimes used and which, if drawn into the water supply system would produce the most serious results. Of course, even where less harmful contaminated water is used in the tanks, drawing thereof into the water supply system would not be tolerated in practice. This feature of back-drawing of the water from the tank is very effectually prevented with the device described.

Under slow leakage of water into the trap 12 such as would be produced by a leaking valve in the supply pipe 16 or by a valve not tightly closed, the slowly flowing water will simply drip down the side of the siphon through the air gap to the bottom of the casing 7 and from thence it will run out through the drain pipe 17 by causing overflow of the trap 18.

When partial vacuum or suction is produced in the vapor escape pipe 20, the steam or vapor from the top of the tank 5 will be drawn through the casing and out through said pipe 20, but the trap 18 will prevent vapors from being drawn from the waste pipe 21. Of course, such low vacuum will be produced in pipe 20 as not to draw the water out of the trap 18. Even when pipe 20 is connected to the outside atmosphere, the steam or vapor from the tank will find a free escape through the pipe 20. Also if drain 21 should accidentally become stopped up then the overflow would be taken off by pipe 20 so that said water supply pipe 16 has this additional safeguard against any contaminated water reaching it.

I claim:

1. A water feed device adapted to deliver water from a source of supply to a sterilizing receptacle, provided with an air gap across which water will be projected to the receptacle under full flow but down the side of which water will run adhering to the side thereof under slow flow such as produced by a leaky valve whereby water will only be added to said sterilizer when it is desired to do so.

2. A device for delivering water from a source of supply to a receptacle comprising a shell provided in its bottom with a waste conduit and provided higher up at one side with a port for delivery to the receptacle, and a water-sealing trap located in said casing and through which the water is delivered, the delivery leg of said trap being spaced from said lateral port to form an air gap across which water will be projected into said port and hence into said receptacle under normal flow, but down which air gap water will run to said waste conduit under slow flow such as produced by a leaky valve.

3. A device adapted to deliver water from a source of supply to a receptacle, provided with an air gap across which water will be projected to the receptacle under full flow but down which water will run under slow flow such as produced by a leaky valve, the water supply conduit to said device having a vacuum-breaking air inlet port whereby contamination from said receptacle is prevented from reaching said water supply.

4. A device adapted to deliver water from a source of supply to a receptacle, provided with an air gap across which water will be projected to the receptacle under full flow but down which water will run under slow flow such as produced by a leaky valve, the water supply conduit to said device having a vacuum-breaking air inlet port, and a water-sealing trap below said air port and said water supply.

5. A device for delivering water from a source of supply to a receptacle comprising a shell provided in its bottom with a waste conduit and provided higher up at one side with a port for delivery to the receptacle, and a water-sealing trap located in said casing and through which the water is delivered, the delivery leg of said trap being spaced from said lateral port to form an air gap across which water will be projected into said port and hence into said receptacle under normal flow, but down which air gap water will run to said waste conduit under slow flow such as produced by a leaky valve, said casing having a vapor discharge conduit leading therefrom at a point between said waste conduit and the end of said trap.

6. A water receptacle and a water supply pipe, in combination with a water delivery device interposed between said supply pipe and receptacle and comprising a casing having a lateral port arranged to deliver into said receptacle, a water-sealing trap in said casing, the receiving end of which is connected to said water supply pipe and the delivery end of which is spaced from said lateral water delivery port to afford an intervening air gap across which water will be projected to said port under normal flow but through which gap water flow as under leakage will run to the bottom of said casing.

7. A water receptacle and a water supply pipe, in combination with a water delivery device interposed between said supply pipe and receptacle and comprising a casing having a lateral port arranged to deliver into said receptacle, a water-sealing trap in said casing, the receiving end of which is connected to said water supply pipe and the delivery end of which is spaced from said lateral water delivery port to afford an intervening air gap across which water will be projected to said port under normal flow but through which gap water flow as under leakage will run to the bottom of said casing, and a deflecting flange extended over the delivery end of said water-sealing trap for deflecting the water into the lateral delivery port of said casing.

8. A water receptacle and a water supply pipe, in combination with a water delivery device interposed between said supply pipe and receptacle and comprising a casing having a lateral port arranged to deliver into said receptacle, a water-sealing trap in said casing, the receiving end of which is connected to said water supply pipe and the delivery end of which is spaced from said lateral water delivery port to afford an intervening air gap across which water will be projected to said port under normal flow but through which gap water flow as under leakage will run to the bottom of said casing, the bottom of said lateral delivery port determining the altitude of water in said receptacle and the delivery end of said trap being at a higher altitude than bottom and at a lower altitude than top of said lateral port.

9. A device adapted to deliver water from a source of supply to a receptacle provided at its head with means for setting up a whirling motion of the incoming water and having an axially located vacuum-breaking air intake port.

10. A device adapted to deliver water from a source of supply to a receptacle provided at its head with means for setting up a whirling motion of the incoming water and having an axially located vacuum-breaking air intake port, in combination with a casing having a lateral port for the delivery of water therefrom and a water-sealing trap, the receiving end of which is connected to the receiving head of said device, and the delivery end of which is located adjacent to said lateral port, but spaced therefrom so as to form an air gap whereby water under full flow will be discharged across said gap and into said lateral port while slow flow such as produced by a leaky valve will run down said gap to the bottom of said casing.

11. A water feed device adapted to deliver water from a source of supply to a sterilizer, provided with an air gap across which water will be projected to the sterilizer under full flow but down which water will run under slow flow such as produced by a leaky valve, the water supply conduit to said sterilizer having a vacuum breaking means.

12. A device for delivering water from a source of supply to a receptacle comprising a shell provided in its bottom with a waste conduit and provided higher up at one side with a port for delivery to the receptacle, an air gap across which water will be projected into said port and hence into said receptacle under normal flow, but down which air gap water will run to said waste conduit under slow flow such as produced by a leaky valve.

13. A device adapted to deliver water from a source of supply to a receptacle, provided with an air gap across which water will be projected to the receptacle under full flow but down which water will run under slow flow such as produced by a leaky valve, the water supply conduit to said device having a vacuum-breaking means and a water-sealing trap and which trap is located below said air port and said water supply.

14. A device for delivering water from a source of supply to a receptacle comprising a shell provided in its bottom with a waste conduit and provided higher up at one side with a port for delivery to the receptacle, means in said shell through which the water is delivered, said means being spaced from said lateral port to form an air gap across which water will be projected into said port and hence into said receptacle under normal flow, but down which air gap water will run to said waste conduit under slow flow such as produced by a leaky valve, said casing having a vapor discharge conduit leading therefrom at a point between said waste conduit and the end of said water delivery means.

15. A water feed device adapted to deliver water from a source of supply to a sterilizing receptacle, provided with an air gap across which water will be projected to the receptacle under normal flow but down the side of which water will run adhering to the said side thereof under slow flow whereby water will be positively prevented from being added to said sterilizer accidentally.

In testimony whereof I affix my signature.

WALTER G. HOLMES.